DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 7

T904,009

PHOTOGRAPHIC SILVER RECOVERY PROCESS

Paul J. Delmore, 1669 Lake Ave.,
Rochester, N.Y. 14650

Filed Dec. 27, 1971, Ser. No. 212,690
Int. Cl. C22d *1/12;* C22b *11/00*
U.S. Cl. 204—109
No Drawing. 7 Pages Specification

A photographic silver recovery process involves the production of crude silver containing about 97% silver, 1% lead, 1% copper and 1% of other impurities. To separate the silver, the crude silver is cast in the form of anodes and the silver plated out in an electrolytic cell containing silver nitrate electrolyte. As the plating process proceeds, the concentration of lead nitrate and copper nitrate formed in the electrolyte increases. It is desirable to remove excess lead and copper from the electrolyte. A portion of the electrolyte is first treated with silver oxide. The resulting sludge contains, for example, about 30% silver oxide, 5% each of lead and copper hydroxides (calculated as silver, lead and copper) and varying amounts of silver nitrate solution. In order to avoid an explosion which may result from direct smelting of the sludge, it is first treated with hydrochloric acid or sulfuric acid solution and the resulting silver chloride or silver sulfate sludge is then smelted to obtain silver substantially free of lead and copper.